United States Patent [19]
Namikawa et al.

[11] Patent Number: 6,070,911
[45] Date of Patent: Jun. 6, 2000

[54] CLAMP-TYPE PIPE JOINT

[75] Inventors: Yasuo Namikawa; Toshikazu Nakamura; Keizo Hosoya; Muneyasu Ichimura, all of Kanagawa, Japan

[73] Assignee: JGC Corporation, Tokyo, Japan

[21] Appl. No.: 09/260,577

[22] Filed: Mar. 1, 1999

[51] Int. Cl.$^7$ .................................................. F16L 11/12
[52] U.S. Cl. ..................... 285/48; 285/364; 285/334.2; 277/943; 277/919; 277/654
[58] Field of Search ................. 285/48, 53, 54, 285/364–366, 369, 334.2, 50, 49; 277/919, 943, 652, 654

[56] References Cited

U.S. PATENT DOCUMENTS

| | | | |
|---|---|---|---|
| 1,592,175 | 7/1926 | Boyd ......................................... | 285/48 |
| 2,774,621 | 12/1956 | Kilbourne, Jr. ......................... | 277/652 |
| 3,286,341 | 11/1966 | Miller ................................. | 285/334.2 |
| 3,328,053 | 6/1967 | Mattimore et al. ..................... | 285/365 |
| 3,382,563 | 5/1968 | Barroil ..................................... | 285/54 |
| 3,503,632 | 3/1970 | Braun ..................................... | 285/48 |
| 4,326,737 | 4/1982 | Lehmann ............................... | 285/365 |
| 4,406,467 | 9/1983 | Burger et al. ........................... | 277/919 |
| 4,411,457 | 10/1983 | Inoue et al. ............................... | 285/54 |
| 4,776,600 | 10/1988 | Kohn ....................................... | 285/48 |
| 5,072,952 | 12/1991 | Irrgeher et al. ......................... | 277/652 |
| 5,082,297 | 1/1992 | Flasher ................................... | 277/652 |
| 5,359,148 | 10/1994 | Okase et al. ............................. | 285/364 |
| 5,494,301 | 2/1996 | Hamilton et al. ....................... | 277/652 |
| 5,551,706 | 9/1996 | Barna et al. ............................. | 277/672 |

FOREIGN PATENT DOCUMENTS

| | | | |
|---|---|---|---|
| 745184 | 5/1933 | France ..................................... | 285/48 |
| 1600446 | 2/1970 | Germany ................................. | 285/48 |
| 40-3223588 | 10/1991 | Japan ....................................... | 285/50 |
| 773541 | 4/1957 | United Kingdom ................... | 285/48 |

*Primary Examiner*—Eric K. Nicholson
*Attorney, Agent, or Firm*—Jordan and Hamburg LLP

[57] ABSTRACT

A clamp-type isolating pipe joint is disclosed, which can connect pipes by providing insulation between them, is easy to assemble and disassemble, has high reliability and allows easy replacement of parts and is inexpensive to manufacture and install. The joint comprises hubs weldable to connectable pipes, a seal ring interposed between butted surfaces of the hubs and a clamp disposed around the circumferences of the hubs for clamping itself with bolts in the radial direction of the hubs to be fixed as insulated from each other. The clamp and hubs are insulated by interposing between them a metal plate with an insulating resin coat formed thereon. Insulation layers are also provided between the seal ring and the hubs.

12 Claims, 2 Drawing Sheets

CLAMP-TYPE PIPE JOINT

BACKGROUND OF THE INVENTION

The present invention relates to a pipe joint for connecting pipes and, more particularly, to electrically insulated pipe joints usable for connecting pipes to be laid underground with cathodic protection.

In conducting protection of, e.g., a buried natural gas pipeline against corrosion, it is necessary to electrically insulate the underground piping by providing an isolating pipe joint with each ground riser portion of the piping. Up to now, flange-type pipe joints and/or monolithic-type isolating joints have been predominantly used for the above purpose. A typical flange-type pipe joint is shown in FIG. 1, which includes weld neck flanges 1a, 1b, insulating sleeve 2, insulating washer 3, steel washer 4, insulating gasket ring for raised face 5, steel stud bolt 6, nut 7. However, the pipe joint of this type is so large and heavy that it cannot be easily handled and requires complicated assembling works for accurately centering bolt holes bored in weld neck flanges 1a, 1b and evenly fastening a number of bolts 6 and nuts 7. In particular, the flange-type pipe joints used for high-pressure pipeline may often be troubled with leakage of pressurized line content and in many cases cannot stop the leakage by tightening their fixing bolts.

An example of the monolithic-type isolating pipe joint is shown in section in FIG. 2, which includes short pipes 11a, 11b, steel-made parts 12, 13, 14, seal gaskets 15, isolating rings 16, 17, an insulating filler 18 and welds $W_1$, $W_2$, $W_3$.

As shown in FIG. 2, the monolithic isolating pipe joint isolates left and right pipes (short pipes 11a and 11b) from each other by isolating rings 16 and 17, thus achieving considerable savings in size as compared with the flange-type pipe joint. However, the monolithic isolating joint takes many steps to manufacture. Namely, the steel parts 13 and 14 are welded with the welds $W_1$ and $W_2$ to the short pipes 11a and 11b respectively. The isolating rings 16 and 17 are mounted with the insulating filler 18 on the welded steel-made parts, then the short pipes 11a and 11b are butt-welded with the weld $W_3$ while applying a specified pressure to the surface of the seal gasket 15. Thus, the monolithic isolating joint is so complex in design that it takes many steps to manufacture and requires several times higher cost than the flange-type insulating pipe joint.

On the other hand, there has been introduced a clamp-type pipe joint "GRAYLOC" (registered trademark) being a circumferentially self-clamping-type pipe joint to improve the conventional high-pressure pipe joints being large size, heavy and difficult to fasten and disassemble and very expensive to manufacture.

FIGS. 3A and 3B illustrate the clamp-type pipe joint GRAYLOC before and after fastening its clamp, which includes hubs 21a, 21b, a seal ring 22, a seal-ring rib 22R, a seal-ring contact surface 22L, a clamp 23 and a clamp contact surface S.

This pipe joint does not require aligning bolt-holes while it is needed for flange-type pipe joints. The GRAYLOC pipe joint is of self-clamping-type that has been well proven in practice to work with high reliability under high pressure of fluid. However, the GRAYLOC pipe joint has not been designed to assure sufficient electrical insulation between the pipes.

SUMMARY OF THE INVENTION

An object of the present invention is to provide a clamp-type isolating pipe joint for connecting pipes as isolated from each other, which is easy to assemble and disassemble, easy to repair for stopping leakage by tightening, reliable in working under a high pressure of pipeline, easy to exchange parts and inexpensive to manufacture.

Another object of the present invention is to provide a clamp-type pipe joint that includes hubs attached to respective pipes to be connected, a seal ring interposed between butted surfaces of the hubs and a clamp disposed around the circumferences of the butted hubs for applying a clamping force to the hubs and is characterized in that the hubs are pressed to each other via the seal ring to form an insulation between the hubs.

Another object of the present invention is to provide a clamp-type pipe joint in which the insulation is composed of an insulator disposed between the seal ring and the hubs and an insulator disposed between the clamp and the hubs.

Another object of the present invention is to provide a clamp-type pipe joint in which either one or both of the insulators are composed of insulating-resin coated layers.

Another object of the present invention is to provide a clamp-type pipe joint in which either one or both of the insulators are composed of a non-conductive ceramic layer formed by thermal spraying of ceramics, which is impregnated with insulating resin.

Another object of the present invention is to provide a clamp-type pipe joint in which either one or both of the insulators are composed of lamination formed by uniting one or more alternately superimposed layers of metal and insulating resin.

PREFERRED EMBODIMENT OF THE INVENTION

Figure 1:
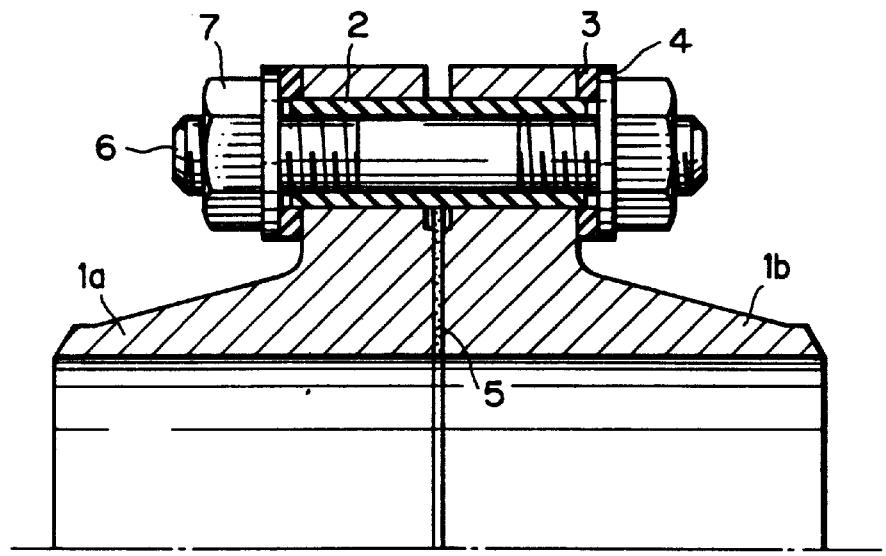
FIG. 1 is a side exterior view of a conventional flange-type insulating pipe joint.
Figure 2:
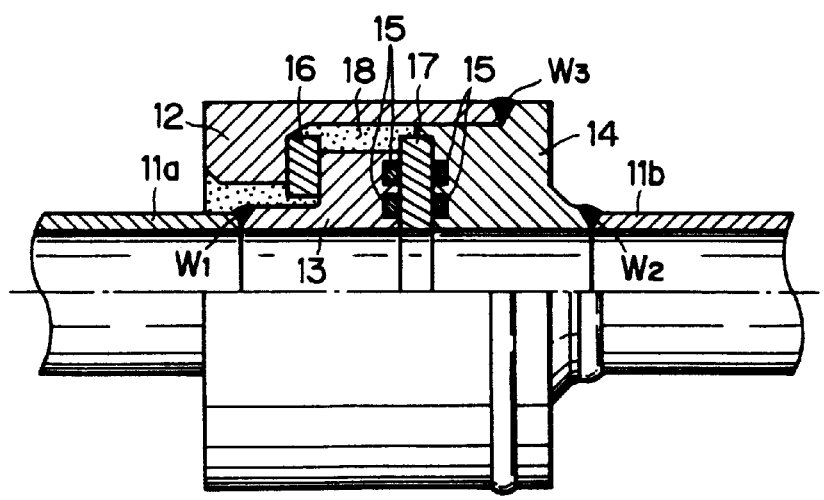
FIG. 2 is a sectional view of conventional monolithic isolating pipe-joint.
Figure 3A:
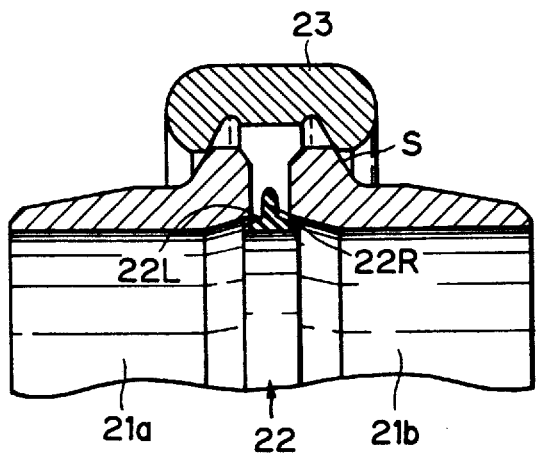
FIG. 3 is a sectional view of conventional circumferentially self-clamping-type clamp pipe joint.
Figure 3B:
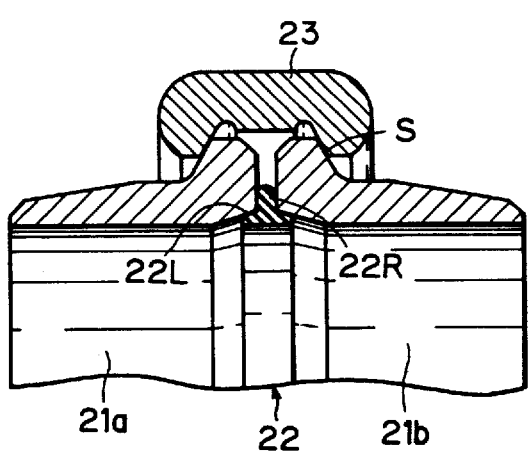

A clamp-type pipe joint according to the present invention is used as a suitable isolating pipe-joint for an underground pipeline to be protected against corrosion. Particularly, this pipe joint can reliably work under high-pressure of the pressurized line content and is inexpensive to manufacture. The clamp-type pipe joint is based on an improved construction of the conventional GRAYLOC pipe joint since this type joint has proved to be reliable in many high-pressure applications but be lack of provision of electrical insulation of pipes to be connected. The isolating construction is created by providing insulation (1) between a seal ring and hubs (connecting ends of pipes) and insulation (2) between a clamp and contact surfaces of hubs.

The insulation (1) in particular must have high compressive strength to hubs because it must work under high pressure. Accordingly, it is very important to select insulating material of high compressive strength and a coating method adapted to form a layer of an insulating resin on the seal ring.

The above-mentioned insulation of respective portions will be described below in detail.
Insulation (1) between a seal ring and hubs Insulation coating for the above purpose has been made usually by using, e.g., PTFE (polytetrafluoro-ethylene)

resin. A coated film of this resin is, however, of low compressive strength and involves such a problem that it reduces insulation resistance after fastening the joint. Therefore, material and thickness of the insulation film were examined first. In this instance, each hub has a nickel-plating surface for contacting with the seal ring.

A joint having an excellent insulation and airtightness can be formed between the seal ring and the hubs by covering the seal ring with a coat of material having high insulation resistance and mechanical strength against a stress applied thereto by fastening the joint. The insulation is formed on the seal ring by applying a 0.1–0.5 mm thick non-conductive layer of ceramic material such as alumina, titania and zirconia and then applying thereon a coat of insulating resin material (e.g., fluoride resin). The insulation may also be made by directly coating the surface of the seal ring with a coat of the insulating resin having high insulation resistance and high compressive strength. The physico-mechanical properties of resin material directly applied to the seal ring must satisfy the below-listed characteristic values. Examples of suitable resin material are fiber-reinforced plastic, PVDF (polyvinylidene fluoride) and MC nylon.

Volume Resistivity (ASTM D-253) must be not less than $10^{14}$ Ω-cm.
Compressive Strength (ASTM D-695) must be not less than 800 kg/cm$^2$.
Shear Strength (ASTM D-732) must be not less than 800 kg/cm$^2$.
Heat Distortion Temperature (ASTM D-648) must be not lower than 100° C. (at 18.5 kg/cm$^2$).

Although the resin coat is required to maintain thickness of not less than 0.01 mm after assembling the joint, it is desirable to have thickness of not less than 0.1 mm in view of mechanical damage of its surface that may occur during transportation and handling of the joint.

Insulation (2) of the contact surface of the clamp

The conventional clamp pipe joint causes electric conduction between both hubs of pipes through the contact of the clamp. This can be avoided by applying a coat of insulating resin material (similar to the insulation 1) to the clamp and the hubs or by interposing lamination of metal and resin material shown in FIG. 4 between the clamp and the hubs.

Figure 4:
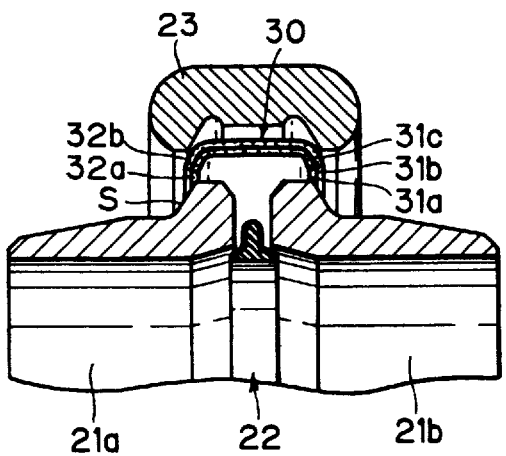
FIG. 4 is a sectional view for conceptually showing the construction of a clamp-type pipe joint according to an embodiment of the present invention.

FIG. 4 is illustrative in section of a conceptual construction of a clamp pipe joint embodying the present invention, which includes a preformed metal plate 30, composed of metal plates 31a, 31b, 31c, resin-made layers 32a, 32b. Besides components 31a to 31c and 32a, 32b which are featuring the present invention, all other components similar to those of the conventional product are given the same reference numerals.

Figure 5:
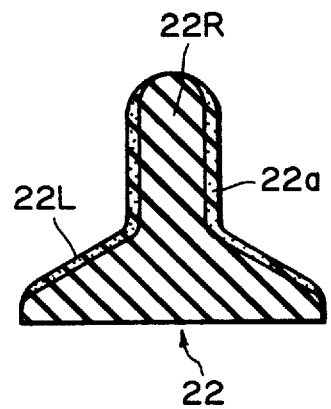
FIG. 5 is a sectional view of the seal ring shown in FIG. 4 by enlarged scale.

FIG. 5 shows a sectional view of the seal ring 22 by enlarged scale in which 22a shows insulating layer.

Table 1 shows the comparison of manufacturing and installation costs for various types of pipe joints.

TABLE 1

| Types of Pipe Joints | Manufacturing Cost | Installation Cost |
| --- | --- | --- |
| Flange type | 3 | 5 |
| Monolithic type | 5 | 2 |
| The present invention type | 2 | 1 |

In Table 1, the manufacturing cost of each pipe joint is estimated at its purchase price and the installation cost is an expense for welding the pipe joint to the piping at the site.

Table 2 shows the comparison data of insulation resistance of the pipe joints, which data was obtained by comparing the pipe joints of diameter 2B and class 2500LB according to the present invention with the conventional pipe joints of the same diameter and class. In Table 2, insulating construction A consists of a 0.3 mm thick under layer of thermally sprayed alumina and a 0.1 mm thick upper layer of baking-coated resin PTFE for the seal ring and the clamp-contacting surfaces, while insulating construction B consists of a 0.2 mm thick layer of baking coated resin PVDF for the seal ring and the clamp contacting surfaces.

TABLE 2

| Types of Joints | | Weight (kg) | Insulation Resistance (MΩ/500 V) |
| --- | --- | --- | --- |
| Conventional type | Flanged type | 43 | 50–100 |
|  | Monolithic type | 60 | >100 |
| The present invention type | Insulation A | 10 | >100 |
|  | Insulation B | 10 | >100 |

Table 2 shows that the pipe joints according to the present invention have the same level of insulation resistance as the monolithic isolating joint and are several times lighter than the conventional types and very easy to handle. The pipe joints of the invention also satisfy the requirement of British Standard BS 7361, Parts 14.3.1.3 defining insulation resistance of not less than 2 MΩ (500 V) for applicable pipe joints.

The pipe joints according to the present invention are of the clamp-type provided with insulating ability suited to use for underground pipelines to be protected against electric erosion. They are also easy to install on the pipeline at site and can be easily tightened to reliably stop leakage therethrough. The use of the pipe joints of the invention in particular for a high-pressure pipeline can increase the reliability of the lines and offer the advantage of reducing installation and maintenance costs. Repairing the pipe joints with decreased insulating resistance due to aged deterioration of insulation can be easily done by replacing seal rings and clamps with new ones.

What is claimed is:

1. A clamp-type high-pressure pipe joint, comprising:
   hubs attached to respective pipes to be connected;
   a seal ring interposed between butted surfaces of the hubs;
   a clamp disposed around a circumference of the butted hubs for giving clamping force to the hubs;
   a first insulator disposed between the seal ring and the hubs;
   a second insulator disposed between the clamp and the hubs;
   the hubs being pressed to each other through the seal ring and the first insulator which are interposed therebetween to form an insulation between the butted surfaces of the hubs; and
   at least one of the first and second insulators including a non-conductive ceramic layer formed by thermal spraying of ceramic material, which is impregnated with insulating resin.

2. A clamp-type pipe joint according to claim 1, wherein said non-conductive ceramic layer has a thickness of about 0.1 mm to about 0.5 mm.

3. A clamp-type pipe joint according to claim 1, wherein said ceramic material is at least one material selected from the group consisting of alumina, titania and zirconia.

4. A clamp-type pipe joint according to claim 1, wherein said insulating resin comprises fluoride resin.

5. A clamp-type pipe joint according to claim 1, wherein said second insulator includes an alternating laminated structure of metal and insulating resin.

6. A clamp-type pipe joint for sealingly interconnecting pipes end-to-end in mutual longitudinal alignment, the pipes including hubs at ends thereof, the pipe joint comprising:

a seal ring receivable between confronting end surfaces of the pipes to be joined;

a clamp disposable about the hubs for urging the confronting end surfaces together in response to an applied clamping force; and the seal ring including a support structure and a first insulating layer disposed on a surface portion of the support structure which is brought into abutted contact with the confronting end surfaces when hubs are clamped, contact engagement of the first insulating layer with the hubs establishing a pressure-resistant seal therebetween, said first layer comprising a non-conductive ceramic layer impregnated with an insulating resin.

7. A clamp-type pipe joint according to claim 6, wherein said insulating layer is formed by thermal spraying of ceramic material to form a non-conductive layer of ceramic material, and by applying an insulating resin to the non-conductive layer of ceramic material.

8. A clamp-type pipe joint according to claim 6, wherein said non-conductive ceramic layer has a thickness of about 0.1 mm to about 0.5 mm.

9. A clamp-type pipe joint according to claim 6, wherein said ceramic material is at least one material selected from the group consisting of alumina, titania and zirconia.

10. A clamp-type pipe joint according to claim 6, wherein said insulating resin comprises fluoride resin.

11. A clamp-type pipe joint for sealingly interconnecting pipes end-to-end in mutual longitudinal alignment, the pipes including hubs at ends thereof, the pipe joint comprising:

a seal ring receivable between confronting end surfaces of the pipes to be joined;

a clamp disposable about the hubs for urging the confronting end surfaces together in response to an applied clamping force; and the seal ring including a support structure and a first insulating layer disposed on a surface portion of the support structure which is brought into abutted contact with the confronting end surfaces when hubs are clamped, contact engagement of the first insulating layer with the hubs establishing a pressure-resistant seal therebetween, said first insulating layer comprising an insulating resin;

said insulating resin presenting the following characteristics:

a volume resistivity of not less than $10^{14}$ $\Omega$-cm;

compressive strength of not less than 800 kg/cm$^2$;

shear strength (ASTM D-732) of not less than 800 kg/cm$^2$; and heat distortion temperature (ASTM D-648) of not lower than 100° C. (at 18.5 kg/cm$^2$).

12. A clamp-type pipe joint for sealingly interconnecting pipes end-to-end in mutual longitudinal alignment, the pipes including hubs at ends thereof, the pipe joint comprising:

a seal ring receivable between confronting end surfaces of the pipes to be joined;

a clamp disposable about the hubs for urging the confronting end surfaces together in response to an applied clamping force;

the seal ring including a support structure and a first insulating layer disposed on a surface portion of the support structure which is brought into abutted contact with the confronting end surfaces when hubs are clamped, contact engagement of the first insulating layer with the hubs establishing a pressure-resistant seal therebetween;

a second insulating layer disposed between the hubs and a surface of the clamp opposed thereto; and said second insulating layer including one of a coated layer of resin on said clamp and an element comprised of alternating laminated structure of metal and insulating resin receivable between the clamp and the hubs.

* * * * *